United States Patent
Compain

(10) Patent No.: US 6,955,343 B2
(45) Date of Patent: Oct. 18, 2005

(54) ANTIVIBRATION LINK

(75) Inventor: Laurent Compain, Saran (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/683,779

(22) Filed: Oct. 10, 2003

(65) Prior Publication Data

US 2004/0113040 A1   Jun. 17, 2004

(30) Foreign Application Priority Data

Oct. 21, 2002   (FR) .................................. 02 13108

(51) Int. Cl.$^7$ .............................. F16C 7/02; F16C 7/04; F16C 7/08; B60K 5/12
(52) U.S. Cl. ................. 267/140.11; 248/638; 180/291; 267/140.5
(58) Field of Search ................................ 248/564, 568, 248/636, 562, 638, 634, 583, 660–662, 610; 384/220; 267/140.11–140.13, 140.3, 140.4, 267/152, 141, 292–294, 141.2, 140.5; 180/291, 180/300, 299, 902, 311, 312; 74/579 R; 416/140, 416/134; 403/52, 53, 54, 64, 290, 57, 326; 464/89, 180

(56) References Cited

U.S. PATENT DOCUMENTS

| | | | |
|---|---|---|---|
| 5,364,061 A * | 11/1994 | Ciolczyk et al. | 248/610 |
| 6,270,418 B1 * | 8/2001 | Oka et al. | 464/89 |
| 6,588,533 B2 * | 7/2003 | Larmande et al. | 180/291 |
| 2004/0113043 A1 * | 6/2004 | Compain | 248/564 |

FOREIGN PATENT DOCUMENTS

| | | |
|---|---|---|
| EP | 0 647 787 A1 | 7/1994 |
| EP | 894 659 B1 | 2/1999 |
| EP | 000995928 A2 * | 4/2000 |
| EP | 001413780 A1 * | 4/2004 |
| FR | 2 765 503 A1 | 3/1997 |
| FR | 2 794 502 A1 | 2/1999 |
| FR | 2 794 503 A1 | 12/2000 |
| FR | 2846060 * | 4/2004 |
| JP | 2004-144303 * | 5/2004 |

OTHER PUBLICATIONS

French Preliminary Search Report for FR 0213108 dated Jun. 27, 2003.

* cited by examiner

Primary Examiner—Douglas C. Butler
(74) Attorney, Agent, or Firm—Marshall, Gerstein & Borun LLP

(57) ABSTRACT

An antivibration link for isolating two parts, the link comprising a rigid body extending in a longitudinal direction between a first end provided with a sleeve and a second end, a first antivibration joint arranged in the sleeve and presenting a central axis perpendicular to the longitudinal direction of the body, and a second antivibration joint arranged on the second end and presenting a central axis perpendicular both to the central axis of the first joint and to the longitudinal direction. The second end of the body has two branches extending from an intermediate base portion of the body away from the sleeve along the longitudinal direction and interconnected by a bridge extending along the central axis of the second joint, the second joint being arranged around the bridge.

12 Claims, 2 Drawing Sheets

ANTIVIBRATION LINK

FIELD OF THE INVENTION

The present invention relates to antivibration links, as used in particular the automobile industry, for example for taking up torque from engine units.

More particularly, the invention relates to an antivibration link for isolating two parts, the link comprising a rigid body extending in a longitudinal direction between a first end provided with a sleeve and a second end, a first antivibration joint arranged in said sleeve and presenting a central axis perpendicular to the longitudinal direction of said body, and a second antivibration joint arranged on said second end and presenting a central axis perpendicular both to the central axis of the first joint and to the longitudinal direction of the body.

BACKGROUND OF THE INVENTION

The body of a link of this type in which the antivibration joints present mutually perpendicular axes is generally constituted by a metal part obtained by casting. Since such a part is relatively expensive, there have been attempts to make a link body out of twisted or folded sheet metal.

For example, document FR-A-2 794 502 describes a link made of sheet metal and including two sleeves in which two antivibration joints are inserted, each joint being constituted by a central armature made of steel secured to an outer ring via an elastomer body. The first sleeve is made at a relatively flat first end out of sheet metal and the second sleeve is made out of two side tabs that are folded against each other and form a second end of the body of the link. The antivibration joints are mounted in the body of the link by means of their outer rings being engaged by force in the sleeves.

That type of link requires stamping, folding, and force-fit assembly operations, and therefore remains relatively expensive.

OBJECT AND SUMMARY OF THE INVENTION

The object of the present invention is to mitigate the drawbacks of prior art links by proposing an antivibration link whose cost, associated with manufacturing operations and the quantity of material used, is particularly low, while nevertheless presenting good strength.

To this end, according to the invention, a link of the kind in question is characterized in that the second end of said body has two branches extending from an intermediate portion of the body away from the sleeve along the longitudinal direction and interconnected by a bridge extending along said central axis of the second joint, said second joint being arranged around said bridge.

By means of these dispositions, the body of the link can be made simply and at reduced cost.

Furthermore, the cost of manufacturing the second joint is greatly reduced. The central armature of the second joint is formed by the bridge of the link body. In addition, this joint is not assembled as a force-fit, and does not require an outer ring.

In preferred embodiments of the invention, recourse may also be made to one or more of the following dispositions:

the second joint comprises an elastomer body overmolded on the bridge;
the bridge presents a central region between two end regions, said central region presenting a cross-section that is greater than the cross-section of the end regions, the second joint surrounding said central region;
the bridge is situated at a distance d from the intermediate portion of the body, said distance d being adapted to leave an empty space between the second joint and said intermediate portion;
the second joint comprises an elastomer body presenting a cross-section about its central axis that is suitable for being held captive between the recess of a fork secured to one of the parts to be isolated and a cover removably mounted on the ends of said fork;
the cross-section of the second joint presents a D-shaped outline;
the body is formed by at least one sheet-metal plate, each comprising two branches and a bridge together forming at least a portion of the branches and of the bridge of the body of the link;
the sleeve at the first end of the body is perpendicular to the mean plane of the sheet, and the bridge at the second end of the body lies in the mean plane of the sheet;
the body comprises two sheet-metal plates each presenting a first face that is substantially plane, a first end having a sleeve extending perpendicularly from a second face of said plate, and a second end comprising two branches interconnected by a bridge, said plane first faces of the plates being placed against each other and the two plates being bonded together to form said body;
at least one of the two plates includes at least one tongue extending integrally from the central region of the bridge of said plate and folded over onto said bridge against the second face of said plate;
at least one of the two plates includes ridges extending along both branches of said plate and projecting from the second face of said plate;
at least one of the two plates has tongues integral with the edges of said plate and folded over the second face of the adjacent plate; and
the body is completely overmolded in an elastomer.

BRIEF DESCRIPTION OF THE DRAWINGS

Other characteristics and advantages of the invention appear from the following description given by way of non-limiting example and made with reference to the accompanying drawings, in which.

MORE DETAILED DESCRIPTION

In the various figures, the same references are used to designate elements that are identical or similar.

Figure 1:
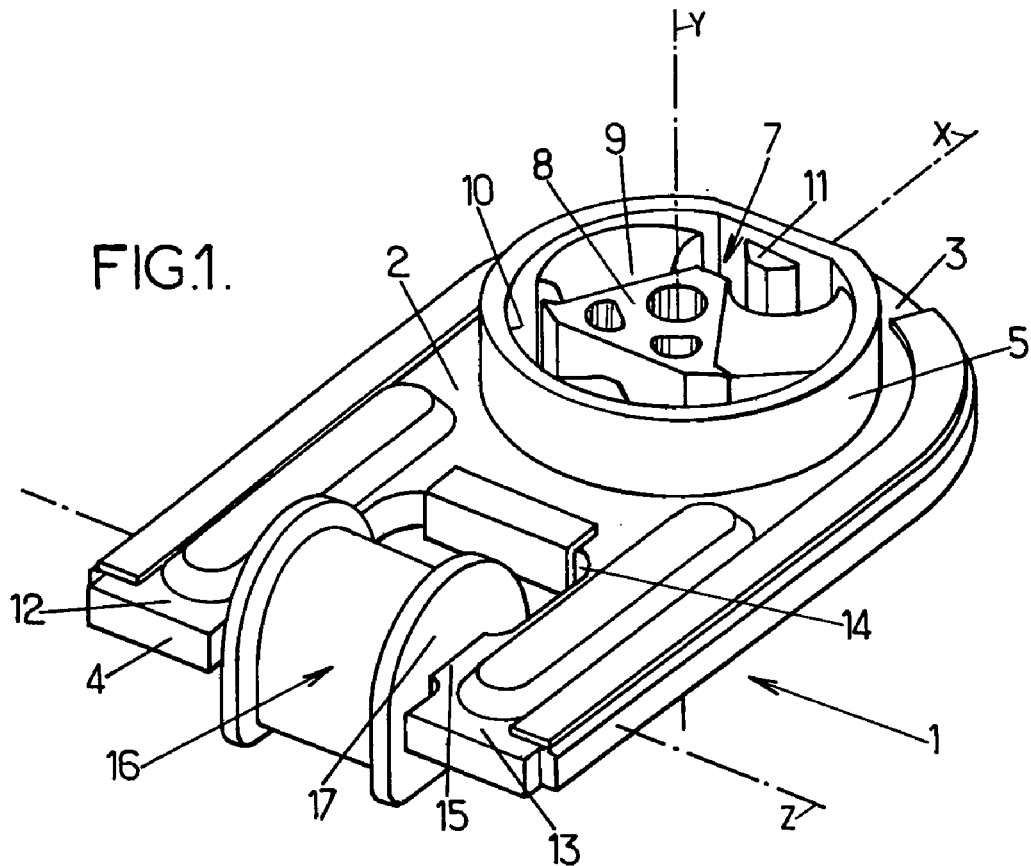
FIG. 1 is a perspective view of an antivibration link made in accordance with the invention.

As shown in FIG. 1, the invention relates to an antivibration link 1, e.g. for taking up the torque from a motor vehicle engine unit (not shown).

This antivibration link 1 comprises a rigid body 2, e.g. made of steel, extending along a longitudinal direction X between a first end 3 and a second end 4.

The first end 3 includes a sleeve 5 in which a first antivibration joint 7 is disposed. The joint 7 presents an inner metal armature 8 forming a central axis Y perpendicular to the longitudinal axis X of the body 2. An elastomer body 9 of geometrical shape suitable for damping vibration is bonded to the inner armature 8. The elastomer body 9 is also bonded to a ring 10 engaged as a force-fit in the sleeve 5.

Nevertheless, it is possible to mold the elastomer body 9 while the inner armature 8 is placed inside the sleeve 5 so that the elastomer body is bonded directly to the inside wall of the sleeve 5.

The ring 10 of the first joint may include elastomer abutments 11 for limiting the movements of the inner armature 8.

The second end 4 of the body of the link presents two branches 12 & 13 which extend from an intermediate portion 14 of the body 2 away form the sleeve 5 in the longitudinal direction X of the body 2. The two branches 12 & 13 are interconnected by a bridge 15 which extends along an axis Z perpendicular to the central axis Y of the first joint 7.

A second joint 16 is arranged around the bridge 15, with the axis Z of the bridge forming the central axis of the second joint 16.

Thus, the link presents central joint axes Y and Z that are mutually perpendicular and it can be made out of sheet metal without requiring any folding or twisting operations.

In addition, the bridge 15 constitutes an inner armature, thereby enabling the number of parts needed for making the second joint 15 to be reduced.

The second joint 16 comprises an elastomer body 17 overmolded directly on the bridge 15, thereby simplifying assembly of the second joint 16.

Figure 2:
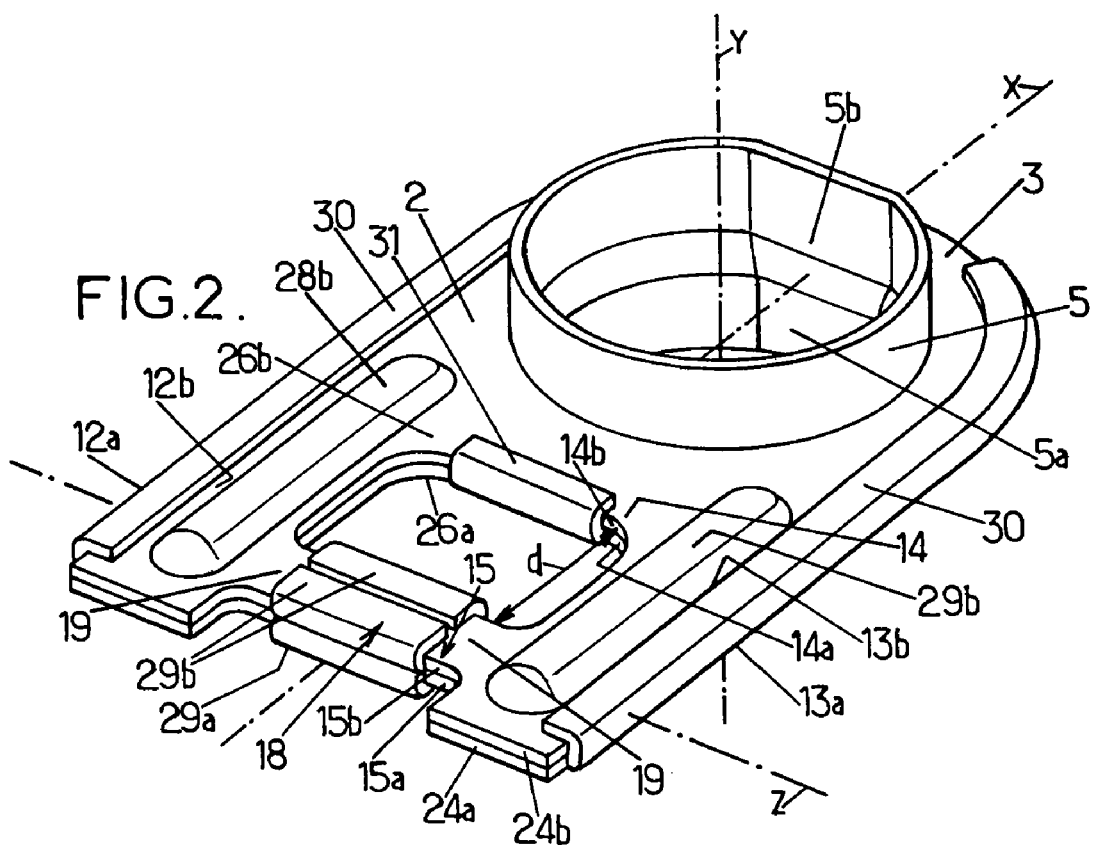
FIG. 2 is a perspective view of the body on its own of the link shown in FIG. 1.

As can be seen in FIG. 2, which shows the body 2 of the link on its own prior to the antivibration joints being assembled therewith, the bridge 15 presents a central region 18 of cross-section relative to the axis Z that is larger than the cross-section of the adjacent end regions 19 of the bridge.

This extra thickness in the central region 18 of the bridge made in a manner that is described in greater detail below serves to provide a good bonding for the elastomer body 17 overmolded on said central region and prevents any movement in translation of the elastomer body along the bridge 15. It also serves to obtain a desired thickness of elastomer and thus a desired stiffness for the joint, for a given outside diameter of the body 17.

The bridge 15 is situated at a distance d (shown in FIG. 2) from the intermediate portion 14 which forms the base for the two branches 12 & 13. Said distance d is selected so as to leave an empty space between the second joint 16 and said intermediate portion 14.

Figure 3:
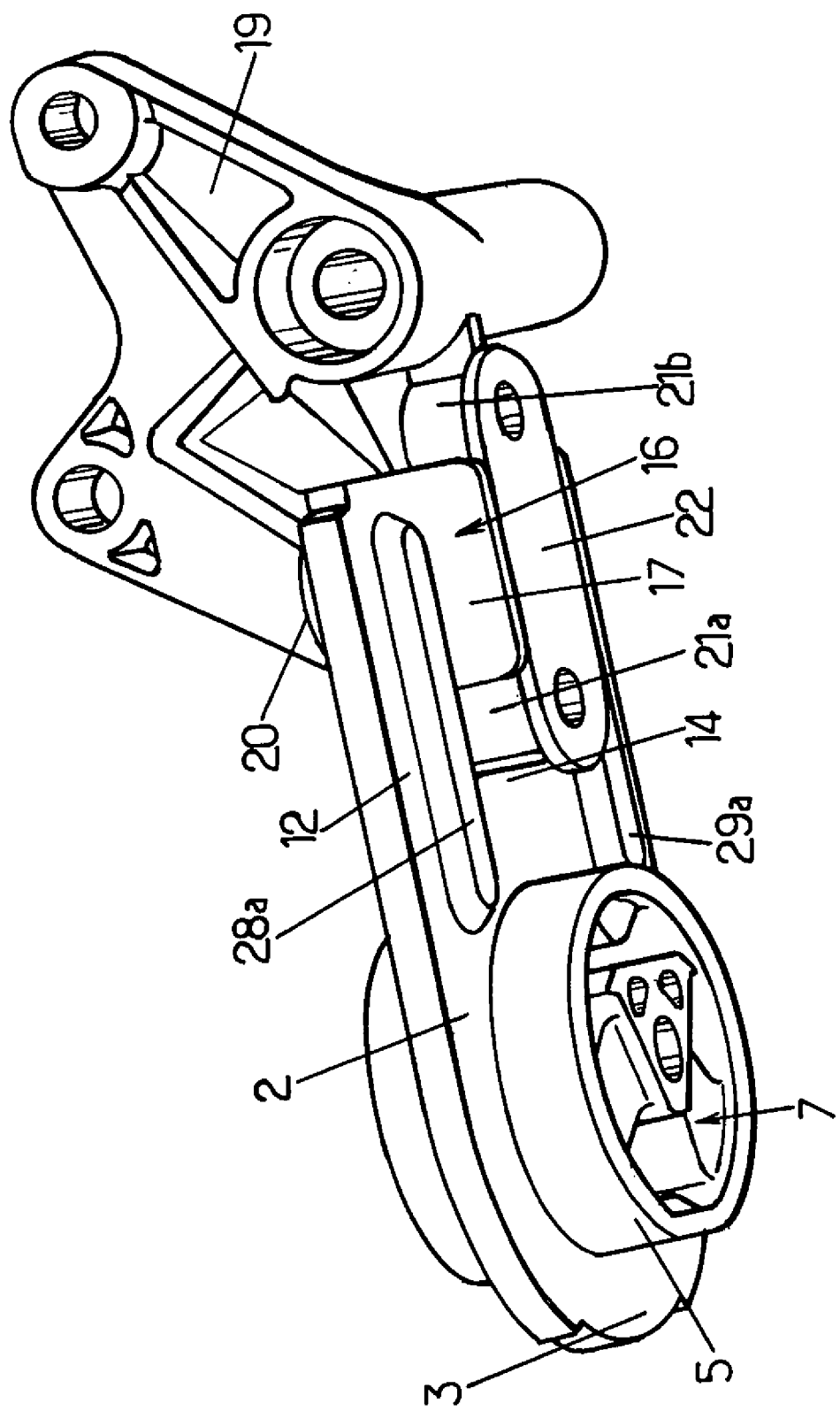
FIG. 3 is a perspective view of the FIG. 1 link with one of its joints mounted in a support.

As can be seen in FIG. 3, this empty space allows a support 19 on which the second joint 16 is secured to pass through. The support 19 is also secured to one of the parts that are to be isolated from each other (not shown in FIG. 3), e.g. an engine unit.

The support 19 has a fork 20 presenting two ends 21*a* & 21*b* defining a U-shaped recess. A cover 22 which is flat in the example shown is removably mounted on the end 21*a* & 21*b* of the fork by means of bolts (not shown) so as to close the recess of the U-shape.

The cross-section relative to the axis Z of the elastomer body 17 of the second joint 16 presents an outline suitable for being held captive between the recess of the fork 20 and the cover 22.

The cross-section of the elastomer body 17 presents a D-shaped outline, i.e. a portion for coming into contact with the cover 22 is flat so as to prevent the support 19 from turning relative to the second joint 16.

The body 2 of the link is made of sheet metal which is stamped so as to form in particular the sleeve 5 at the first end 3. Stamping enables a sleeve 5 to be obtained that presents a longitudinal axis perpendicular to the mean plane of the sheet and that coincides with the central axis Y of the first joint 7. The bridge 15 which forms the central axis Z of the second joint 16 lies in the mean plane of the sheet.

Nevertheless, it should be observed that the fact that the bridge 15 of the body 2 forms both the internal armature of the second joint 16 and a support on which it is assembled, serves to reduce the cost of making the link even if the body 2 is not made of stamped sheet metal, but is made in the form of an extruded or cast aluminum part, or indeed as a cast iron part.

As can be seen in FIG. 2, the body 2 of the link is made up of two sheet-metal plates 24*a* & 24*b*. Each plate 24*a* & 24*b* presents a first face that is substantially plane and not shown in the figures.

In order to form the link body, the two plates 24*a* & 24*b* are placed plane face against plane face and are bonded together.

Each plate 24*a* & 24*b* presents a respective second face 26*a*, 26*b* provided with portions in relief that are substantially identical for both plates.

Each plate 24*a*, 24*b* has a respective sleeve 5*a*, 5*b* extending perpendicularly from its second face 26*a*, 26*b*. Together the two sleeves 5*a*, 5*b* make up the sleeve 5 once the plates 24*a* & 24*b* have been assembled together.

The two plates 24*a*, 24*b* also have two branches 12*a* & 13*a*, 12*b* & 13*b* and respective bridges 15*a*, 15*b* which together form the second end 4 of the body 2 of the link once the plates have been assembled together.

The branches 12*a* & 13*a*, 12*b* & 13*b* of the plates have ridges 28*a* & 29*a*, 28*b* & 29*b* extending along the longitudinal axis X and projecting from the second faces 26*a*, 26*b* of the two plates. These ridges enable the stiffness of the link body to be increased considerably.

In order to increase the cross-section of the central region 18 of the bridge 15, it is possible to provide tongues 29*a* & 29*b* formed integrally with the edges of the central region of the bridges 15*a* & 15*b* and folded over onto the bridges against the second faces 26*a* & 26*b* of the two plates 24*a* & 24*b*.

The first plate 24*a* has tongues 30 & 31 integral with the longitudinal edges and the intermediate portion 14*a* of said first plate.

This disposition enables the two plates 24*a* & 24*b* to be secured to each other by folding the tongues 30 & 31 of the first plate 24*a* against the second face 26*b* of the second plate 24*b*. Naturally, it is possible to use other means, such as welding, for bonding the two plates together.

By using two plates instead of a single plate, it is possible to use sheet metal of finer gauge that can be worked with tooling of lighter weight than would be needed to make a link of equivalent strength using a single sheet. Consequently, the use of two plates enables the manufacturing costs of the link to be kept down.

As shown in FIGS. 1 and 3, the body 2 of the link is entirely overmolded in elastomer, e.g. when molding the elastomer bodies 9 & 17 of the first and second joints 7 & 16. This overmolding provides the body of the link with excellent protection against corrosion and it contributes to some extent to making the vehicle quieter.

What is claimed is:

1. An antivibration link for isolating two parts, the link comprising a rigid body extending in a longitudinal direction between a first end provided with a sleeve and a second end, a first antivibration joint arranged in said sleeve and presenting a central axis perpendicular to the longitudinal direction of said body, and a second antivibration joint arranged on said second end and presenting a central axis perpendicular both to the central axis of the first joint and to the longitudinal direction, wherein the second end of said body has two branches extending from an intermediate portion of the body away from the sleeve along the longitudinal direction and interconnected by a bridge extending along said central axis of the second joint, said second joint being arranged around said bridge and comprising an elastomer body overmolded on the bridge.

2. A link according to claim 1, in wherein the bridge presents a central region between two end regions, said central region presenting a cross-section that is greater than the cross-section of the end regions, the second joint surrounding said central region.

3. A link according to claim 1, wherein the bridge is situated at a distance d from the intermediate portion of the body, said distance d being adapted to leave an empty space between the second joint and said intermediate portion.

4. A link according to claim 1, in wherein the second joint comprises an elastomer body presenting a cross-section about its central axis that is suitable for being held captive between the recess of a fork secured to one of the parts to be isolated and a cover removably mounted on the ends of said fork.

5. A link according to claim 4, wherein the second joint presents a cross-section having a D-shaped outline.

6. A link according to claim 1, wherein the body is formed by at least one sheet-metal plate which comprises two plate branches and a plate bridge together forming at least a portion of the branches and of the bridge of said body of the link.

7. A link according to claim 6, wherein the sleeve at the first end of the body is perpendicular to the mean plane of at least one plate, and the bridge at the second end of said body lies in the mean plane of said at least one plate.

8. A link according to claim 6, wherein the body comprises two sheet-metal plates, each of the said two plates presenting a first face that is substantially plane, a second face opposite to the first face, a first end having a plate sleeve extending perpendicularly from the second face thereof, and a second end comprising two plate branches interconnected by a plate bridge, said plane first faces of said two plates being placed against each other and said two plates being bonded together to form said body.

9. A link according to claim 8, wherein at least one of the two plates includes at least one tongue extending integrally from the central region of the plate bridge of said at least one of the two plates and folded over onto said plate bridge against the second face of said at least one of the two plates.

10. A link according to claim 8, wherein at least one of the two plates includes ridges extending along both plate branches of said at least one of the two plates and projecting from the second face of said at least one of the two plates.

11. A link according to claim 8, wherein at least one of the two plates has edges and tongues integral with the edges of said at least one of the two plates and folded over the second face of the adjacent plate.

12. A link according to claim 1, wherein the body is completely overmolded in an elastomer.

\* \* \* \* \*

UNITED STATES PATENT AND TRADEMARK OFFICE
CERTIFICATE OF CORRECTION

PATENT NO. : 6,955,343 B2 Page 1 of 1
APPLICATION NO. : 10/683779
DATED : October 18, 2005
INVENTOR(S) : Laurent Compain It is certified that error appears in the above-identified patent and that said Letters Patent is hereby corrected as shown below:

On the Title Page:

At Field (56), U.S. Patent Documents, please delete "2004/0113043" and insert -- 2004/0113040 --.

In the Claims:

At column 5, line 23, claim 1, please delete "in wherein" and insert -- claim 1, wherein --.

Signed and Sealed this

Seventh Day of August, 2007

JON W. DUDAS
*Director of the United States Patent and Trademark Office*